United States Patent [19]
McFadden

[11] 3,710,039
[45] Jan. 9, 1973

[54] METHODS AND APPARATUS FOR ADJUSTING TAPE WITHIN A CARTRIDGE TO MINIMIZE DIFFERENTIAL PHASE SHIFT IN MULTIPLE CHANNEL TAPE RECORDING AND REPRODUCTION

[75] Inventor: William G. McFadden, Annisquam, Mass.

[73] Assignee: Marathon Broadcast Equipment Sales Corp., Danvers, Mass.

[22] Filed: Nov. 24, 1970

[21] Appl. No.: 92,481

[52] U.S. Cl. .............179/100.2 Z, 226/196, 242/199
[51] Int. Cl. ..........................G11b 23/04, G11b 15/60
[58] Field of Search .......179/100.2 Z, 100.2 R, 100.2 MD; 340/174.1 C; 242/199, 200, 76, 55.19 A; 274/4 A, 4 B; 226/196, 198; 352/78, 128

[56] References Cited

UNITED STATES PATENTS

| | | | |
|---|---|---|---|
| 2,706,638 | 4/1955 | Bruderlin et al. | 242/76 |
| 2,938,962 | 5/1960 | Konins et al. | 179/100.2 MD |
| 3,229,045 | 1/1966 | Bakos | 179/100.2 R |
| 3,276,651 | 10/1966 | Bryer | 226/198 |
| 3,549,823 | 9/1965 | Pastor | 179/100.2 Z |

OTHER PUBLICATIONS

Stereo Review Magazine, p 64, 65, September 1971 "-Cassette Malfunctions..."

*Primary Examiner*—Bernard Konick
*Assistant Examiner*—Jay P. Lucas
*Attorney*—Rosen & Steinhilper

[57] ABSTRACT

This disclosure depicts methods and apparatus especially useful for minimizing differential phase shift in the recording and reproduction of plural phase-related signals stored as multiple tracks on magnetic tape. Particular emphasis is placed upon applications in the field of broadcast stereophony. There is disclosed, inter alia, a number of tape magazine embodiments each comprising a casing, tape supply and take-up means providing an accessible loop of the tape, and guide means for accurately guiding the loop of tape through at least one transduction station at which magnetic signals may be applied to or derived from the tape. In each embodiment the tape guidance system is adjustable in azimuth to effect the said minimization of differential phase shift during recording and/or reproduction. In one magazine embodiment disclosed the tape guidance system is adjustable to compensate for errors in track height.

15 Claims, 7 Drawing Figures

INVENTOR
WILLIAM G. McFADDEN
BY
Rosen & Steinhilper
ATTORNEYS

INVENTOR
WILLIAM G. McFADDEN

BY Rosen & Steinhilper
ATTORNEYS

INVENTOR
WILLIAM G. McFADDEN

BY Rosen & Steinhilper
ATTORNEYS

'ENTOR
WILLIAM G. cFADDEN
BY
Rosen & Steinhilper
ATTORNEYS

METHODS AND APPARATUS FOR ADJUSTING TAPE WITHIN A CARTRIDGE TO MINIMIZE DIFFERENTIAL PHASE SHIFT IN MULTIPLE CHANNEL TAPE RECORDING AND REPRODUCTION

BACKGROUND OF THE INVENTION

This invention concerns the recording on magnetic tape of a plurality of laterally spaced tracks of phase-related magnetic signals, and to the reproduction of said such signals in such a way as to minimize differential phase shift between the signals. The term "differential phase shift," especially as applied to stereophony, is herein intended to mean a relative lead or lag between the left and right stereo channels which is introduced by the recording and/or pick-up process.

The principles of this invention, while suited to numerous applications, are particularly useful at the present time as applied to the recording and reproduction of stereo audio signals to be transmitted via FM (frequency modulation). As is well known, some FM stereo program is recorded on magnetic tape as plural laterally spaced tracks. Stereophony is distinguished from monophony by the establishment of two audio channels characterizing sonic information derived from spatially separated pick-up transducers (e.g., microphones). By the use of spatially separated microphones, and corresponding spatially separated reproduction transducers (e.g., loud speakers), the listener is given the impression that the sounds he hears are coming from not one point in space, but rather from a distribution of spatially separated points. In the recording process, spatially separated microphones receive sonic waves which are similar in nature, but different in intensity and phase. The signals thus derived, if reproduced with the appropriate phase relationship, give the impression to the listener that he is receiving sounds from different directions - - e.g., in the case of a symphonic recording, that is he is situated in the presence of the live orchestra.

It is evident that if high fidelity stereo reproduction is to be achieved, the phase relationship between the left and right stereo channels which combine to give the stereo effect must be accurately preserved. Any distortion of the phase relationship between the left and right channels will act to distort, confuse, or even totally destroy the impression of stereophony to the listener.

Further, regulations of the Federal Communications Commission require that broadcast stereo radio signals be monaural compatible — that is, that the signals be capable of being received on monophonic receivers as a high fidelity monaural signal. It is well known that if the left and right stereo signals are not maintained in close phase synchronization, the frequency response of the compatible monaural signal will be distorted. This distortion typically takes the form of a sag in the frequency response curve at the high frequency end of the audio frequency spectrum.

At the heart of the differential phase shift problem, at least as it applies to broadcast FM stereophony, lies the face that the plural magnetic signal-bearing tracks recorded on the tape must be azimuthally registered with the recording or pick-up head gap within a few seconds of arc if the noted FCC specifications on signal quality are to be met. A great number of factors contribute to the problem of maintaining azimuthal track signal-head gap alignment within these very tight tolerances. Among the more significant are the following: misaligned recording and playback heads on recording and playback equipment, variable pinch roller-capstan pressures, and of very great importance - variations in tape guidance structures in tape magazines. Magnetic tape magazines presently in use in the field of broadcast FM stereophony, are either of two types: (1) a cartridge having a single reel which contains an endless coil of tape from which a loop is supplied from the center of the tape coil and taken up at the periphery of the coil, or (2) a cassette comprising two bidirectionally drivable reels which function alternately as take-up and supply reels dependent upon the direction of the tape drive.

Perhaps the most serious magazine deficiencies which can introduce substantial perturbations in the phase relationship of recorded and reproduced stereo signals are those which affect the accuracy of the tape guidance. This invention is particularly directed to solution of the problem of the severe phase shifts introduced by tape guidance systems in conventional tape magazines, especially those of the cartridge type.

Magazines of the cartridge type conventionally have injection-molded plastic casings which include integral therewith a number of tape guides. Due to shrinkage of the plastic material used (acrylonitrile, for example), and other molding factors, as well as wear during extended use, the guidance of the tape through the transduction zones in cartridges typically varies so substantially that differential phase shift between left and right channels in the stereophonic signals from such cartridges may be 180° or more at 5 KHz.

The customary practice of those broadcast stations which seek to achieve highest quality stereophonic transmissions is to laboriously cull from batches of commercially vended stock cartridges those cartridges which introduce the least differential phase shift between stereo channels. To meet the rigorous FCC requirements, differential phase shift tolerances must be held within extremely narrow limits. However, because of the extremely high rejection rate (which may be 95 percent or more) of stock cartridges, many broadcast stations, even those with highest standards of quality, have been forced by quantity demands to accept cartridges having marginal tape guidance accuracy. The cost and time involved in culling stock commercial cartridges has proven to be a substantial burden on the broadcast industry.

A severe problem inherent in the above discussion concerns the low negotiability or transferability of cartridges between studios, or between recorder-playback units within a single studio. A cartridge might be found which gives acceptable stereophonic fidelity from a particular playback unit, however, on another unit the phase distortion may far exceed acceptable limits.

The problem of compatibility of available magazines with a broadcast studio's record-playback unit or units is of such magnitude that studios are willing to in some cases align a transducer head or heads in their record-playback units with the available cartridges. This is manifestly a poor solution since it is impossible to align the heads of a unit with more than a few cartridges; other cartridges will not be compatible with such a misaligned unit. Because of the complexity of the head alignment procedures and the time required, it is impossible in practice to align a record-playback unit with each magazine that is played. The severity of the head alignment problems are evidenced by the recent issuance of patents such as U.S. Pat. No. 3,539,191 — Yamamoto directed to means for adjusting the azimuth of magnetic recording and reproducing heads.

OBJECTS OF THE INVENTION

It is a principal object of this invention to provide methods and apparatus for maximizing the fidelity of signals reproduced from magnetic tape, and particularly for minimizing differential phase shift between channels in multiple channel magnetic tape recording and reproduction.

It is an object of this invention to provide methods and apparatus useful in the recording and reproduction of stereophonic signals with minimal differential phase shift between left and right stereo channels.

It is another object to provide magnetic tape magazines capable of compensating for head gap misalignment in a particular record-playback unit, for variations in magazine casing structures, for the type and characteristics of tape used, for variations in pinch roller-capstan pressures in record-playback units, for variations in magazine pressure pads, and for other factors which might introduce errors in the guidance of tape through transduction zone or zones within a tape magazine.

It is still another object of this invention to make possible the unrestricted compatibility of a particular tape magazine with any reproducer the head or heads of which have been calibrated in azimuth to a predetermined invariant standard.

It is yet another object to provide methods and apparatus for adjusting tape guidance in a magnetic tape magazine such that each cartridge may be individually set for phase error of ± 10° or less at 10 KHz and for minimal differential phase shift over a frequency range of 20 Hz–20 KHz, independent of magazine production tolerances.

It is a further object to provide magnetic tape magazines in which the tape guidance is more accurate, reliable, durable, and stable than previous tape magazines, and to provide magazines which are more economical than present magazines if the true cost of quality control is considered.

It is yet another object to provide magnetic tape magazines capable of compensating for track height errors.

Further objects and advantages of the invention will in part be obvious and will in part become apparent as the following description proceeds. The features of novelty which characterize the invention will be pointed out with particularity in the claims annexed to and forming a part of this specification. BRIEF DESCRIPTION OF THE DRAWINGS For a fuller understanding of the invention, reference may be had to the following detailed description taken in connection with the accompanying drawings wherein:

DESCRIPTION OF THE PREFERRED EMBODIMENTS

Figure 1:
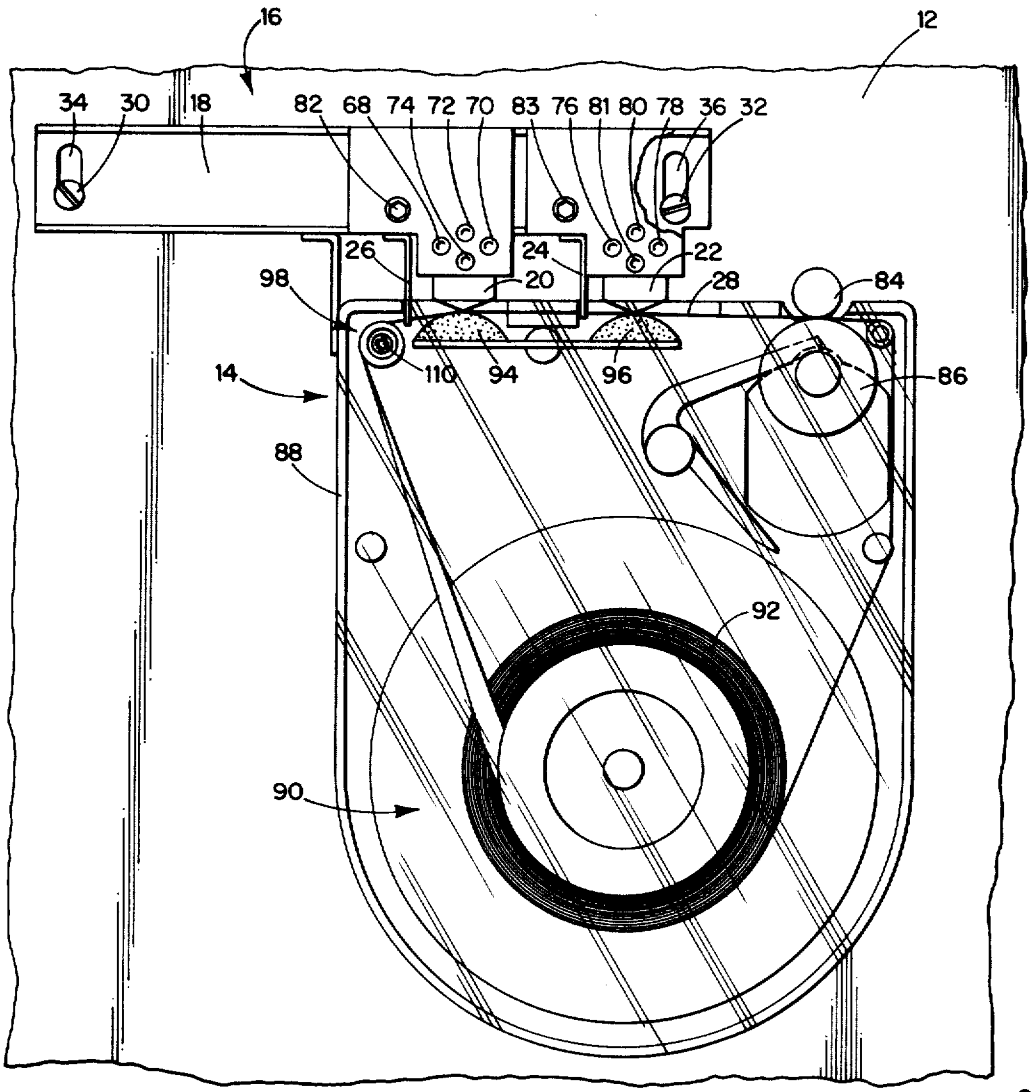
FIG. 1 is a fragmentary schematic plan view of a cartridge-type magnetic tape magazine in operative relationship to record and pick-up heads in a tape record-playback unit.
Figures 2, 3:
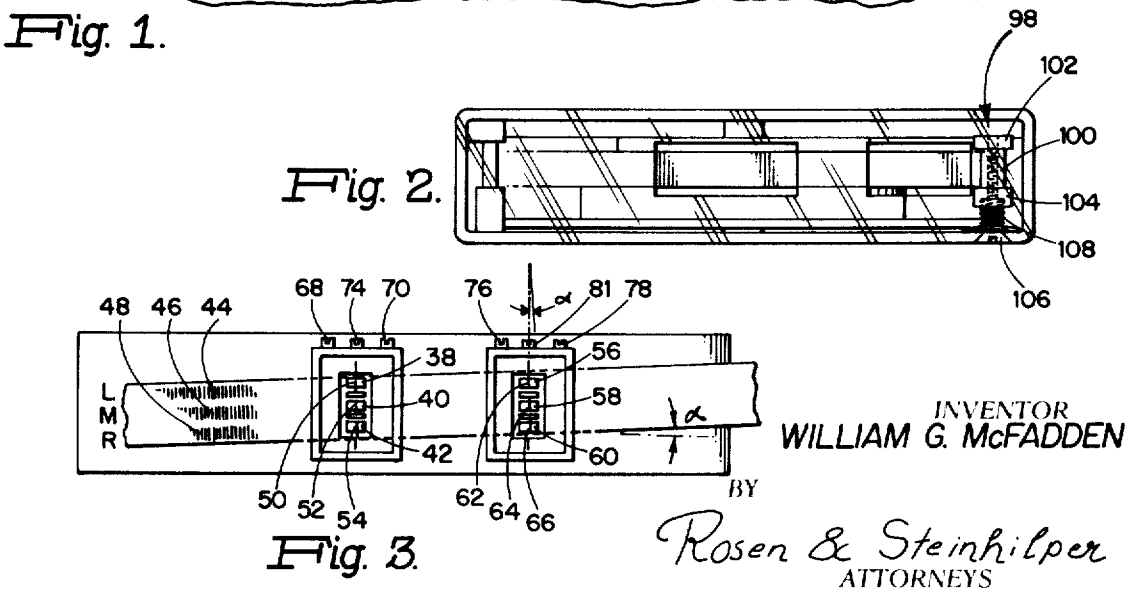
FIG. 2 is an end elevational view of the cartridge shown in FIG. 1.
FIG. 3 is a fragmentary elevational view of the record and pick-up heads shown in FIG. 1, illustrating a tape crossing the heads at an exaggerated skew angle $\alpha$.
Figure 6:
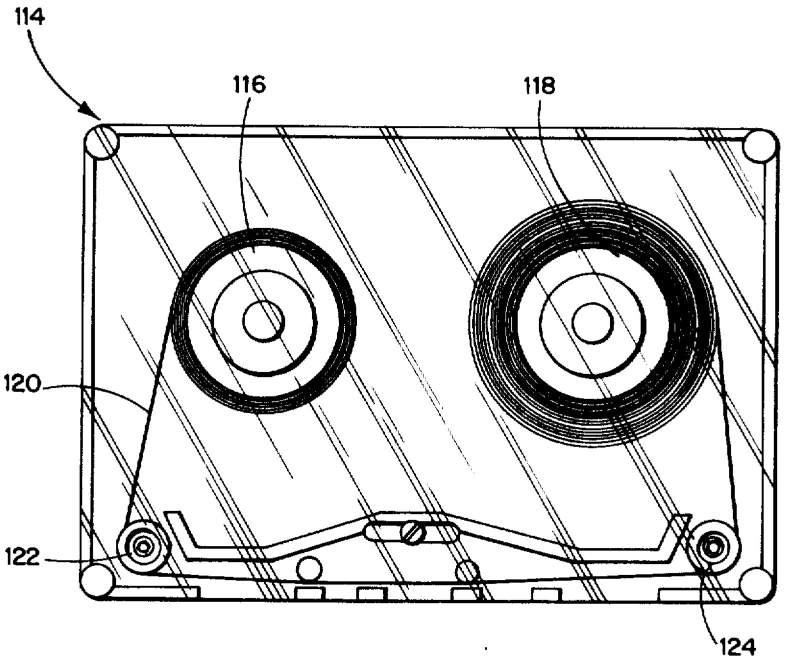
FIGS. 6 and 7 are schematic plan and end elevational views, respectively, of a magazine of the two-reel cassette type which embodies the invention.
Figure 7:
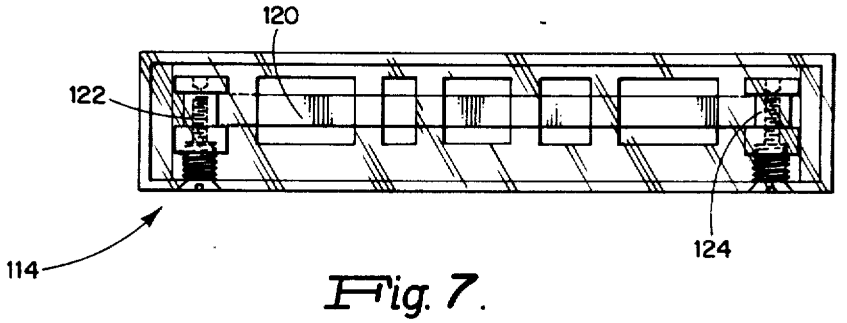

The drawings illustrate two structures implementing the principles of this invention and meeting the above-stated objects. A great number and variety of applications of the invention are contemplated; its usefulness is particularly evident as applied to the recording and reproduction of stereophony because of the differential phase shift which results if close phase synchronization of the left and right stereo channels is not maintained. FIGS. 1–3 show the invention embodied in a stereo magnetic tape magazine of the continuous loop cartridge type for broadcast studio use having a single reel which carries an endless coil of tape; FIGS. 6 and 7 show the invention embodied in a magazine of the cassette (two-reel) type.

The FIGS. 1–3 embodiment will be described first. FIG. 1 shows a portion of the tape deck of a broadcast-type record-playback unit, comprising a deck plate 12 which supports a magnetic tape cartridge 14. The deck plate 12 has adjustably secured thereon a transducer head assembly 16. The head assembly 16 is illustrated as comprising a head mounting bracket 18 supporting a record head 20 and a playback head 22. Tape guide arms 24, 26 extend forwardly from the head mounting bracket and into the cartridge 14 to support tape 28 on opposite sides of transduction zones at which magnetic signals are applied to the tape 28 by the record head 20 and picked off the tape by the playback head 22.

The head mounting bracket 18 is rendered angularly adjustable in the plane of the deck by means of adjustment screws 30, 32 which are received in elongated slots 34, 36 in the bracket 18.

The record head 20 includes three recording transducers, a left stereo channel transducer 38, a right stereo channel transducer 40, a cue signal transducer 42. The transducers 38, 40, and 42 apply magnetic signals to the tape 28 at three transversely spaced locations, creating three laterally spaced and parallel signal tracks 44, 46, and 48. The signals are applied by the recording transducers 38, 40, 42 at respective gaps 50, 52, 54 which are aligned precisely with respect to each other and with respect to the axis of the record head 20 during manufacture thereof.

Certain commercial record-playback units use a single head for both recording and playback, however, in the illustrated embodiment a separate head 22 similar in construction to the recording head 20 is shown. The playback head has a left pick-up transducer 56, a right pick-up transducer 58, and a cue pick-up transducer 60 corresponding to the record head transducers 38, 40, and 42. The pick-up transducers 56, 58, 60 have respective gaps 62, 64, 66 which are also factory pre-aligned.

The head assembly 22 includes a pair of adjustment screws 68, 70 for adjusting the azimuth of the gaps in the record head 20 in a plane which is parallel to the plane of the tape 28 and perpendicular to the plane of the tape deck.

A similar pair of adjustment screws 72, 74 enable the record head 20 to be angularly adjusted in a plane perpendicular to the tape 28 and to the plane of the tape deck.

The head assembly 16 includes another similar set of adjustment screws 76, 78, 80, and 81 for adjusting the azimuth of the gaps in the playback head 22 relative to the planes of the tape 28 and the tape deck. Screws 82 and 83 provide for head height adjustment. The record-playback assembly includes tape drive means shown in the form of a conventional driven capstan 84 and pinch roller assembly 86. A cartridge stop 88 is provided.

Referring particularly to FIG. 3, the tape 28 is shown as including parallel laterally spaced tracks 44, 46, 48 respectively representing the left stereo channel signal, the right channel stereo signal, and the cue signal. The signals are laid down on the tape 28 in the form of a series of lines perpendicular to the edges of the tape. As can be readily deduced from FIG. 3, a skew in the tape 28, herein shown in exaggerated form and labeled angle $\alpha$, causes a relative or differential phase shift in the pick-up or recording of the left and right channel tracks 44, 46. As explained above, if the FCC regulations on differential phase shift and frequency response are to be met, the azimuthal displacement, represented by the angle $\alpha$, between the playback head gaps and the taped stereo signals must be held to a few seconds of arc.

Great care is taken and substantial expenditures are made by the radio broadcast industry to produce the highest possible quality of FM stereo transmissions. It is customary for a broadcast studio to purchase a test tape on which magnetic test signals at various frequencies have been recorded with substantially zero phase differential and near perfect perpendicularity. Using such a test tape, a studio aligns the playback head on each of its record-playback units. Then, each machine is loaded with a blank cartridge with the same accuracy as the alignment tape, and while recording a signal the record head is adjusted until it is in exact alignment with the playback head. At this point, all record-playback units in a studio which have been thus aligned with respect to the described test tape are aligned with respect to each other and with respect to other units in remote locations which have also been calibrated with the same or a substantially identical test tape. Yet, even after having taken such steps to minimize differential phase shift and optimize frequency response in transmitted stereo signals, because of the very great dimensional inaccuracies in the tape guidance structures in conventional cartridges, a studio was, prior to this invention, incapable of consistently broadcasting high fidelity stereophonic signals.

As described above, in order to obtain cartridges with even marginally acceptable tape guidance accuracy, a studio was forced to cull acceptable cartridges from a large batch of commercially available stock cartridges. As noted, the rejection rate has been found to be as high as 95–97 percent. The cost in dollars and time of obtaining cartridges by this method is manifest.

The record and playback heads 20, 22 on a particular record-playback unit can be aligned to a particular cartridge or group of cartridges by means of the adjustment screws 68, 70, 76, 78 to eliminate or suppress to an acceptable level differential phase shift between stereo channels which would otherwise be introduced by the particular cartridge or cartridges. However, as intimated above, this is a very poor solution to the problem since, as a practical matter, a record-playback unit must be capable of being used with a large number of cartridges acquired from any of a variety of sources.

According to this invention, rather than attempting to mate a particular record-playback unit with a particular cartridge, or rather than attempting to obtain acceptable cartridges by a process of selection and rejection, means are provided within the cartridges for adjusting tape guidance such that the cartridges mate with the record-playback units. A cartridge according to this invention which has been adjusted to produce minimal differential phase shift on a record-playback unit which has been calibrated to a pre-defined standard, such as is provided by the described test tape, is compatible with any other unit which has also been calibrated to the same standard. Thus, by this invention, for the first time stereo tape cartridges may be rendered compatible without restriction among units calibrated to the standard provided by the described test tape.

FIGS. 1–3 illustrate a cartridge embodying adjustable guide means constructed to implement the principles of this invention. The cartridge 14 is, with the exception of the tape guidance system, of a commercially available construction marketed by the Assignee of the present invention, and comprises a casing 88 (typically molded from a tough, dimensionally stable plastic material such as acrylonitrile) housing a reel assembly 90 upon which is wound a tape in an endless coil 92. An accessible loop in the tape 28 is provided on which magnetic signals are applied to and derived from the tape 28. Magnetic signals are applied to the tape 28 by the record head 20 in a first transduction zone at which the tape is backed by a first pressure pad 94. Magnetic signals are derived from the tape in a second transduction zone by the playback head 22 as the tape 28 passes over a second pressure pad 96.

The tape guidance system for the cartridge may be rendered adjustable in a variety of ways to implement the teachings of this invention; we have found that very satisfactory results are obtained by providing adjustment capability for the "A" guide 98 exclusively. The "A" guide is herein intended to designate the guide first receiving tape supplied from the tape coil 92. The "A" guide 98 is most critical to skew errors since it is at this point that the tape must be turned from a partially horizontal attitude to a completely vertical attitude for passage through the transduction zones.

In conventional stereo tape cartridges tape guidance is provided by guides molded integrally with the cartridge casing. A tape guidance system of this type is subject to dimensional variations introduced by shrinkage and other factors during the molding processes, and in addition, are apt to wear after long periods of operation and introduce skew in the tape.

Referring particularly to FIGS. 1 and 2, an adjustable "A" guide is illustrated as comprising a guide body 100 having a pair of precisely spaced flanges 102, 104 which define a channel for the tape. The guide body 100 is preferably formed of a hard, wear-resistant material such as chromium plated brass or the like.

The guide body 100 contains an internally threaded bore which is received on a screw 106 supported by the casing 88. The guide body 100 has in its upper end a hexagonal socket 110 for receiving a hex wrench. A coil spring 108 received on the screw 106 between the guide body 100 and the casing 88 acts to hold the guide body 100 against inadvertent rotation which might be caused by shock and vibration, and provides a bias against which a precise adjustment of the position of the guide body 100 may be made.

Figure 4:
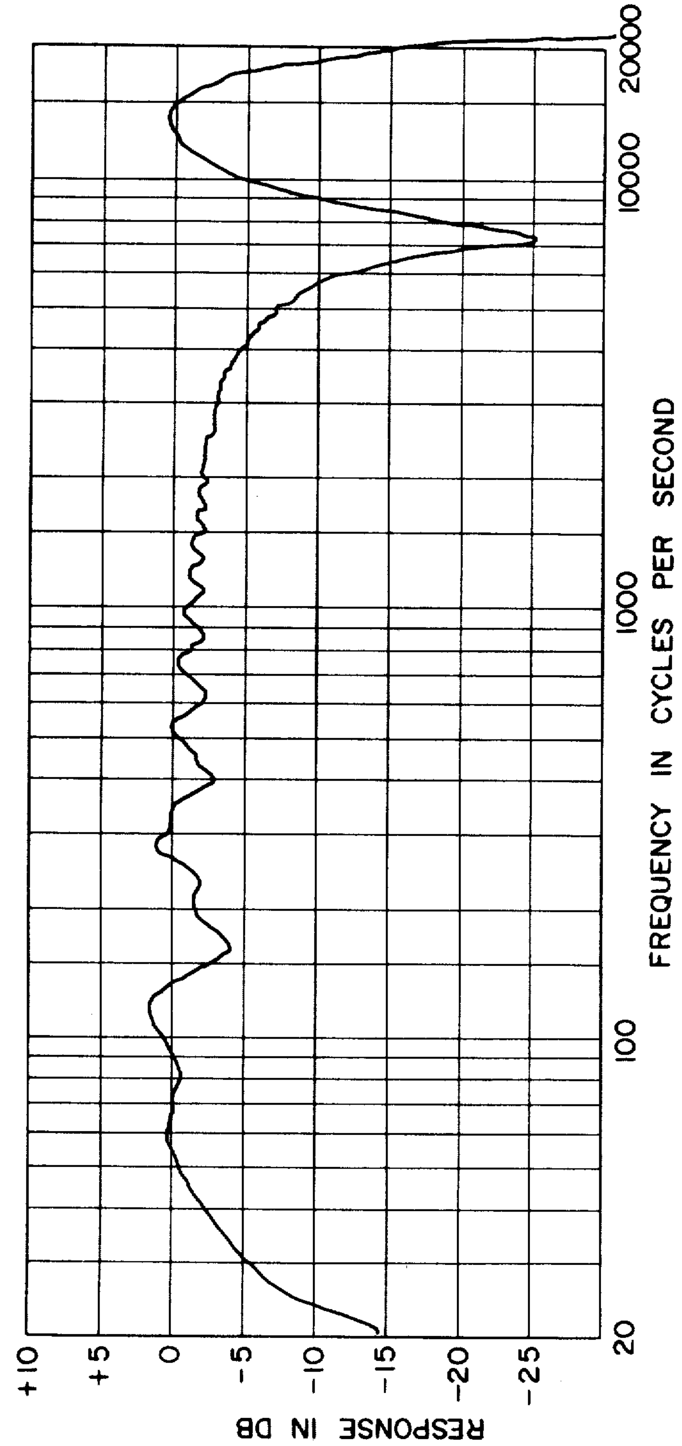
FIG. 4 is a playback frequency response diagram actually produced using a typical commercially vended prior art stereo tape cartridge.
Figure 5:
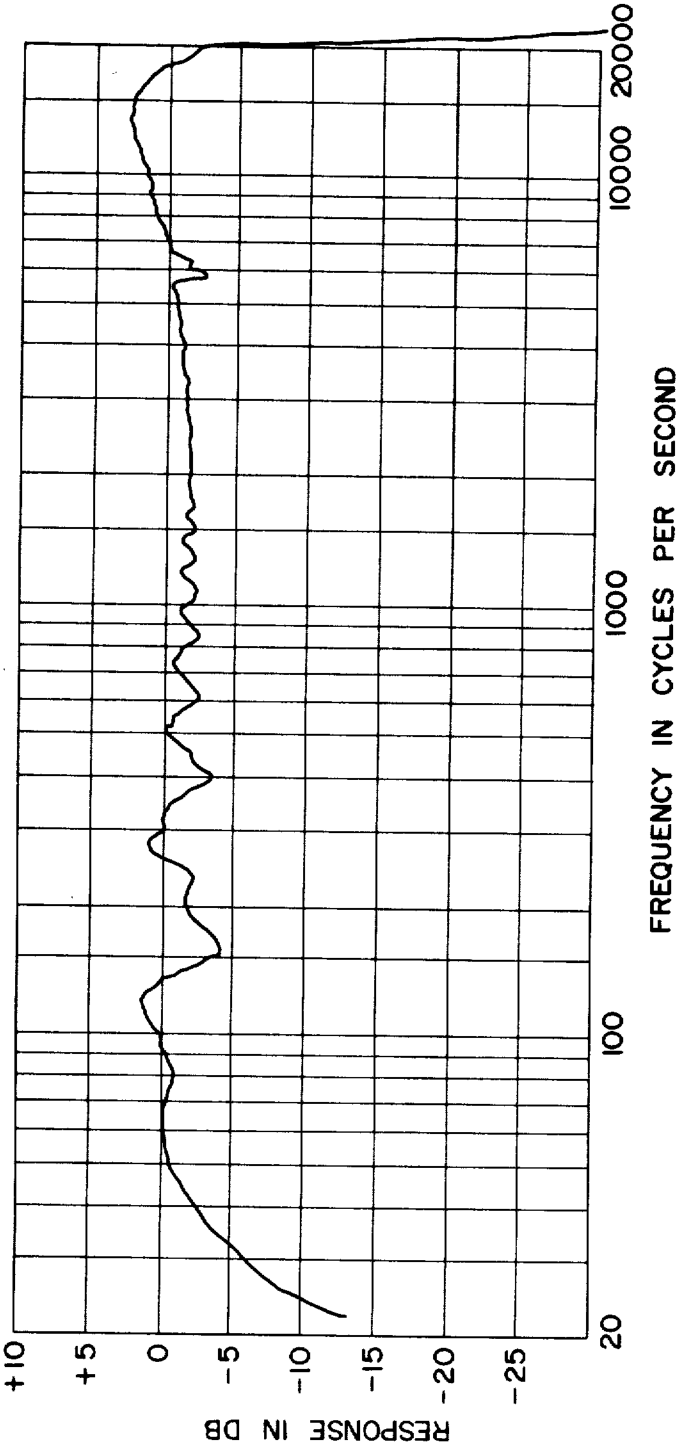
FIG. 5 is a similar diagram produced using a cartridge embodying the present invention.

FIG. 4 depicts a monaural sum signal frequency vs. amplitude characteristic derived from the left and right signals of a stereo cartridge recording using a typical commercially available cartridge. Note the very severe dip in the characteristic at approximately 7,200 Hz which is produced by a very substantial differential phase shift introduced by the cartridge. By contrast, FIG. 5 is a corresponding monaural frequency response curve produced in the same record-playback unit but using a cartridge embodying an adjustable guide as shown in FIGS. 1–2 which has been adjusted to produce minimized differential phase shift. The FIG. 5 curve by comparison is substantially flat throughout the depicted frequency range.

FIGS. 6–7 illustrate the invention embodied in a magnetic tape magazine of the two-reel cassette type. Because of the use of a pair of reels, variations in the azimuth of the tape due to inaccurate tape guidance are less severe in magazines of the cassette-type than in magazines of the cartridge type. Hence, as a practical matter, differential phase shift in stereophonic reproduction resulting from inaccurate tape guidance in commercially available stereophonic cassettes is not as serious a concern as it is with cartridges; however, a tape guidance problem of a different nature is more serious. Because of the very narrow track width (typically 0.020 in.) on cassette tapes, the problem of tape height errors is real. FIGS. 6–7 illustrate a cassette 114 comprising tape storage reels 116, 118 for feeding a tape 120 through a tape guidance system which directs the tape across one or more transduction zones. The illustrated tape guidance system includes a pair of adjustable guides 122, 124 disposed on opposite sides of the transduction zone or zones within the cassette 114. The guides 122, 124 may each be constructed like guide 98 in the FIGS. 1–3 embodiment. The use of a pair of guides rather than a single guide as shown in the FIGS. 1–3 cartridge embodiment, is desirable in a cassette since the reels 116, 118 are not driven unidirectionally, but rather act alternately as supply and take-up reels as the cassette is flipped and the direction of drive reversed. It is preferable that the guide first contacted by the tape as it leaves the reel acting as a supply reel be adjustable according to this invention.

By adjusting the position of guides 122 and 124, the height of the tape, as well as its azimuth, can be precisely and accurately selected.

The invention is not limited to the particular details of construction of the embodiments depicted, and it is contemplated that various and other modifications and applications will occur to those skilled in the art. For example, whereas the invention has been described as having particular utility in magnetic tape magazines of both the cartridge (single reel) and cassette (double reel) reel) types for use in stereo-phonic audio recording and reproduction, the principles of the invention are equally applicable to the recording and pick-up of magnetic signals on magnetic tape in any application wherein a plurality of magnetic signals whose phase relationship is desired to be closely controlled are stored on laterally spaced parallel tracks. We contemplate, for example, application of this invention in video tape recording and reproduction, and in many other applications, including data storage and retrieval and data processing. Application to four track and eight track tape magazines is within the compass of this invention.

Whereas in the FIGS. 1–3 embodiment a single adjustable "A" guide, a second adjustable guide might be added or substituted at the "C" guide location on the opposite side of the transduction zones. In an embodiment wherein tape height adjustability is desired, adjustable "A" and "C" guides would be desirable. Adjustable guides in accordance with this invention might also be located at other points in the tape guidance system.

Whereas an extremely simple adjustable guide structure has been shown, its structure is intended to be exemplary only; a great number of other arrangements and constructions for effecting transverse positioning of the tape at a particular point or points in the tape guidance system may be devised within the purview of this invention. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A magazine for storing a length of flat magnetic tape, comprising:
   - a casing;
   - tape supply and take-up means disposed within said casing and providing an accessible loop of the tape;
   - guide means for accurately guiding said loop of tape through at least one transduction station including magnetic head means external to the casing at which magnetic signals may be applied to or derived from the tape, said guide means including at least one guide having a guide element with means to confine said tape in a prescribed path with respect to said magnetic head means, said guide element being adapted for independent adjustment in the plane of the widthwise dimension and transverse to the lengthwise dimension of the tape and manually operable means coupled to said guide element for adjusting the transverse position of said element to a fixed location between prescribed limits thereby providing the magazine with individualized compensation for skew that may be inherent in a recorded tape system.

2. A continuous tape cartridge for storing a length of flat magnetic tape containing a plurality of laterally spaced tracks of phase-related magnetic signals, comprising:

a casing;

a tape supply and take-up reel mounted for rotation within said casing and providing an accessible loop in the tape between take-off and take-up locations on said reel;

guide means for accurately guiding said loop of tape through at least one transduction station including magnetic head means external to the casing at which magnetic signals may be applied to or derived from the tape, said guide means including at least one adjustable guide having a guide element with means to confine said tape in a prescribed path with respect to said magnetic head means, said guide element being adapted for independent adjustment in the plane of the widthwise dimension and transverse to the lengthwise dimension of the tape and manually operable means coupled to said guide element for adjusting the transverse position of said element, to a fixed location between prescribed limits, adjustment of said adjustable guide varying the azimuth of said tape and thus the relative phase of said phase-related signals with respect to a predetermined external reference line.

3. The apparatus defined by claim 2 wherein said adjustable guide comprises a threaded post supported by said casing, a guide element having a threaded bore receiving said post and spaced flanges for guiding said tape, and spring means between said guide element and said casing, whereby manual rotation of said element effects said adjustment of said guide.

4. The apparatus defined by claim 2 wherein said guide means includes two such adjustable guides disposed on opposite sides of said stations, whereby by adjustment of said guides the height and the azimuth of said tape may be selectively varied.

5. A continuous loop stereo tape cartridge for storing a length of flat magnetic tape containing on laterally spaced tracks phase-related left and right stereo signals, comprising:

a casing;

a tape supply and take-up reel mounted for rotation within said casing and providing an accessible loop in the tape between take-off and take-up locations on said reel;

guide means for accurately guiding said loop of tape through at least one transduction station including magnetic head means external to the casing at which magnetic signals may be applied to or derived from the tape, said guide means including at least one adjustable guide having a guide element with means to confine said tape in a prescribed path with respect to said magnetic head means, said guide element being adapted for independent adjustment in the plane of the widthwise dimension and transverse to the lengthwise dimension of the tape and manually operable means coupled to said guide element for adjusting the transverse position of said element to a fixed location between prescribed limits, adjustment of said adjustable guide varying the azimuth of said tape and thus the relative phase of said phase-related signals with respect to a predetermined external reference line.

6. The apparatus defined by claim 5 wherein said adjustable guide comprises a threaded post supported by said casing, a guide element having a threaded bore receiving said post and spaced flanges for guiding said tape, and spring means between said guide element and said casing, whereby manual rotation of said element effects said adjustment of said guide.

7. A tape cassette for storing a length of flat magnetic tape containing a plurality of laterally spaced tracks of phase-related magnetic signals, comprising:

a casing;

first and second reels each mounted for rotation within said casing and providing an accessible section of the tape between said reels;

guide means for accurately guiding said section of tape through at least one transduction station including magnetic head means external to the casing at which magnetic signals may be applied to or derived from the tape, said guide means including at least one adjustable guide having a guide element with means to confine said tape in a prescribed path with respect to said magnetic head means, said guide element being mounted for independent adjustment in the plane of the widthwise dimension and transverse to the lengthwise dimension of the tape and manually operable means coupled to said guide element for adjusting the transverse position of said element to a fixed location between prescribed limits, adjustment of said adjustable guide varying the azimuth of said tape and thus the relative phase of said phase-related signals with respect to a predetermined external reference line.

8. The apparatus defined by claim 7 wherein said adjustable guide comprises a threaded post supported by said casing, a guide element having a threaded bore receiving said post and spaced flanges for guiding said tape, and spring means between said guide element and said casing, whereby manual rotation of said element effects said adjustment of said guide.

9. The apparatus defined by claim 7 wherein said guide means includes two such adjustable guides disposed on opposite sides of said stations, whereby by adjustment of said guides the height and the azimuth of said tape may be selectively varied.

10. In a magnetic tape stereophonic record-playback system, the combination comprising:

a magazine for storing a length of flat magnetic tape containing on laterally spaced tracks phase-related left and right stereo signals, comprising:

a casing;

tape supply and take-up means disposed within said casing and providing an accessible loop of the tape, and guide means for accurately guiding said loop of tape through at least one transduction zone at which magnetic signals may be applied to or derived from the tape, said guide means including at least one adjustable guide having a guide element with means to confine said tape in a prescribed path, said guide element being adapted for independent adjustment in the plane of the widthwise dimension and transverse to the lengthwise dimension of the tape, and manually operable means coupled to said guide element for adjusting the transverse position of said element to a fixed location between prescribed limits;

a transducer head having a pair of gaps associated with the left and right stereo channels and aligned substantially transverse to the lengthwise dimension of the tape; and means including deck means for supporting said magazine in operative relationship to said transducer head, whereby by adjustment of said adjustable guide the azimuth of said tape relative to said gaps and thus the relative phase of the left and right stereo signals applied to or derived from the tape may be varied to minimize differential phase shift between left and right stereo channels.

11. The apparatus defined by claim 10 wherein said adjustable guide comprises a threaded post supported by said casing, a guide element having a threaded bore receiving said post and spaced flanges for guiding said tape, and spring means between said guide element and said casing, whereby manual rotation of said element effects said adjustment of said guide.

12. The apparatus defined by claim 10 wherein said guide means includes two adjustable guides disposed on opposite sides of said stations, whereby by adjustment of said guides the height and the azimuth of said tape may be selectively varied.

13. The apparatus defined by claim 12 wherein each of said adjustable guides comprises a threaded post supported by said casing, a guide element having a threaded bore receiving said post and spaced flanges for guiding said tape, and spring means between said guide element and said casing, whereby manual rotation of said element effects said adjustment of said guide.

14. A method for minimizing differential phase shift in stereo FM reproduction on a playback unit from plural track flat magnetic tape, comprising:

providing stereo tape magazines having adjustable tape guidance capable of manually varying the azimuth of the tape with respect to a playback head external to said magazines as it passes through a transduction zone or zones within the magazine;

adjusting said tape guidance in each of the tape magazines to a fixed location between prescribed limits in the plane of the widthwise dimension of the tape and transverse to the lengthwise dimension thereof to vary the azimuth of the tape until any differential phase shift between left and right stereo channels at the output of a playback unit is within predefined limits.

15. A method for minimizing differential phase shift in stereo FM broadcasting from plural track flat magnetic tape, comprising:

producing a test tape containing a periodic signal comprising magnetic lines oriented at precisely 90° with respect to the longitudinal axis of the tape;

aligning the transducer gap or gaps on a record-playback unit with respect to the signals on the test tape;

providing stereo tape magazines having adjustable tape guidance capable of manually varying the azimuth of the tape with respect to a playback head external to said magazines as it passes through a transduction zone or zones within the magazine at which magnetic signals may be applied to or derived from the tape; and adjusting said tape guidance in each of the tape magazines to a fixed location between prescribed limits in the plane of the widthwise dimension of the tape and transverse to the lengthwise dimension thereof to vary the azimuth of the tape until any differential phase shift between left and right stereo channels at the output of said unit is within pre-defined limits, whereby tape magazines thus calibrated may be used for recording or reproduction with minimized differential phase shift on any record-playback unit aligned with said test tape or a like test tape.

* * * * *